United States Patent [19]
Carson

[11] Patent Number: 5,490,148
[45] Date of Patent: Feb. 6, 1996

[54] BIT ERROR RATE ESTIMATOR

[75] Inventor: Lansing M. Carson, Chandler, Ariz.

[73] Assignee: Motorola, Inc., Schaumburg, Ill.

[21] Appl. No.: 166,849

[22] Filed: Dec. 15, 1993

[51] Int. Cl.⁶ .................................................. G06F 11/00
[52] U.S. Cl. ............................................. 371/5.1; 375/298
[58] Field of Search .......................... 371/5.1, 6; 375/39,
375/44, 46, 52, 54, 67, 91, 261, 268, 273,
279, 280, 300, 308, 298, 243, 225, 226

[56] References Cited

U.S. PATENT DOCUMENTS

| | | | |
|---|---|---|---|
| 4,085,378 | 4/1978 | Rayan et al. | |
| 4,234,954 | 11/1980 | Lange et al. | 371/6 |
| 4,375,099 | 2/1983 | Waters et al. | 371/6 |
| 4,495,619 | 1/1985 | Acampra | 370/104 |
| 4,580,263 | 4/1986 | Watanabe et al. | 371/5.1 |
| 4,849,990 | 7/1989 | Ikegami et al. | 375/40 |
| 5,049,830 | 9/1991 | Yoshida | 375/83 |
| 5,050,186 | 9/1991 | Gurcan et al. | 375/14 |
| 5,084,891 | 1/1992 | Ariyavisitakul et al. | 371/42 |
| 5,151,926 | 9/1992 | Chennakeshu et al. | 375/84 |
| 5,182,749 | 1/1993 | Kazacki et al. | 375/83 |
| 5,193,222 | 3/1993 | Sasaki | 455/102 |
| 5,202,901 | 4/1993 | Chennakeshu et al. | 375/84 |
| 5,280,537 | 1/1994 | Sugiyama et al. | 371/1 |
| 5,283,815 | 2/1994 | Chennakeshu et al. | 375/84 |
| 5,291,527 | 3/1994 | Haruyama | 375/94 |
| 5,303,263 | 4/1994 | Shoji et al. | 375/11 |
| 5,323,421 | 6/1994 | LaRosa et al. | 375/10 |
| 5,329,547 | 7/1994 | Ling | 375/1 |

OTHER PUBLICATIONS

S. W. Cheung, "Carrier Phase synchronization for a coded PSK Signal in Satellite Links" IEEE 1900 pp. 1413–1417.
Thompson et al., "An All Digital 650-Maps Demostration Receiver for NASA'S High Data Rate Satellite Applications"1992 IEEE pp. 194–198.

Primary Examiner—Robert W. Beausoliel, Jr.
Assistant Examiner—Albert Decady
Attorney, Agent, or Firm—Frank J. Bogacz

[57] ABSTRACT

A bit error estimator produces a count of detected errors in a TDMA burst data radio transmission. An input phase signal is translated into one of a number of quadrants. A feedback phase estimator then averages the difference between the input phase signal and an output phase signal in a feedback loop to determine an average of the signal differences. The bit error rate estimator then produces a pseudo error count over a predefined time period which is proportional to the number and magnitude of any bit errors in the TDMA burst data radio transmission.

17 Claims, 3 Drawing Sheets

BIT ERROR RATE ESTIMATOR

BACKGROUND OF THE INVENTION

The present invention pertains to link quality of transmissions between a radio and a receiver/transmitter and more particularly to an arrangement for estimating the link quality based on an average bit error rate.

Measuring the average signal power over a data burst is subject to errors from intra or inter-system interference. Many of the approaches for bit error rate calculations used for continuous modulation are not useful for TDMA burst data mode transmission.

One method for measuring the error rate of TDMA type data burst transfers is to insert known bits into the TDMA burst. These known bits may then be tested to determine whether they have been properly received. These bits may be place in the preamble, middle or post amble of the TDMA burst. A major drawback of such a system is that since the number of known samples is limited a statistically poor estimate of the bit error rate is likely to result.

It would be highly desirable to provide an accurate arrangement for a pseudo bit error rate for calculation of an accurate bit error for TDMA burst data transmissions.

SUMMARY OF THE INVENTION

A bit error rate estimator has a QPSK decision mapper for mapping an input phase signal into one of four quadrants and for producing an output phase signal representing one of the four quadrants. The bit error rate estimator also has a feedback phase estimator for averaging a difference signal between the input phase signal and the output phase signal. The feedback phase estimator is coupled to the QPSK decision mapper. The bit error rate estimator also has a bit error rate estimator error counter for producing a pseudo error count over a predefined time period of bit errors of the input phase signal. This bit error rate pseudo error count is proportional to the number of bit errors and to a magnitude of the bit errors of the input phase signal. The bit error rate estimator error counter is coupled to the feedback phase estimator.

DESCRIPTION OF THE PREFERRED EMBODIMENT

Figure 1:
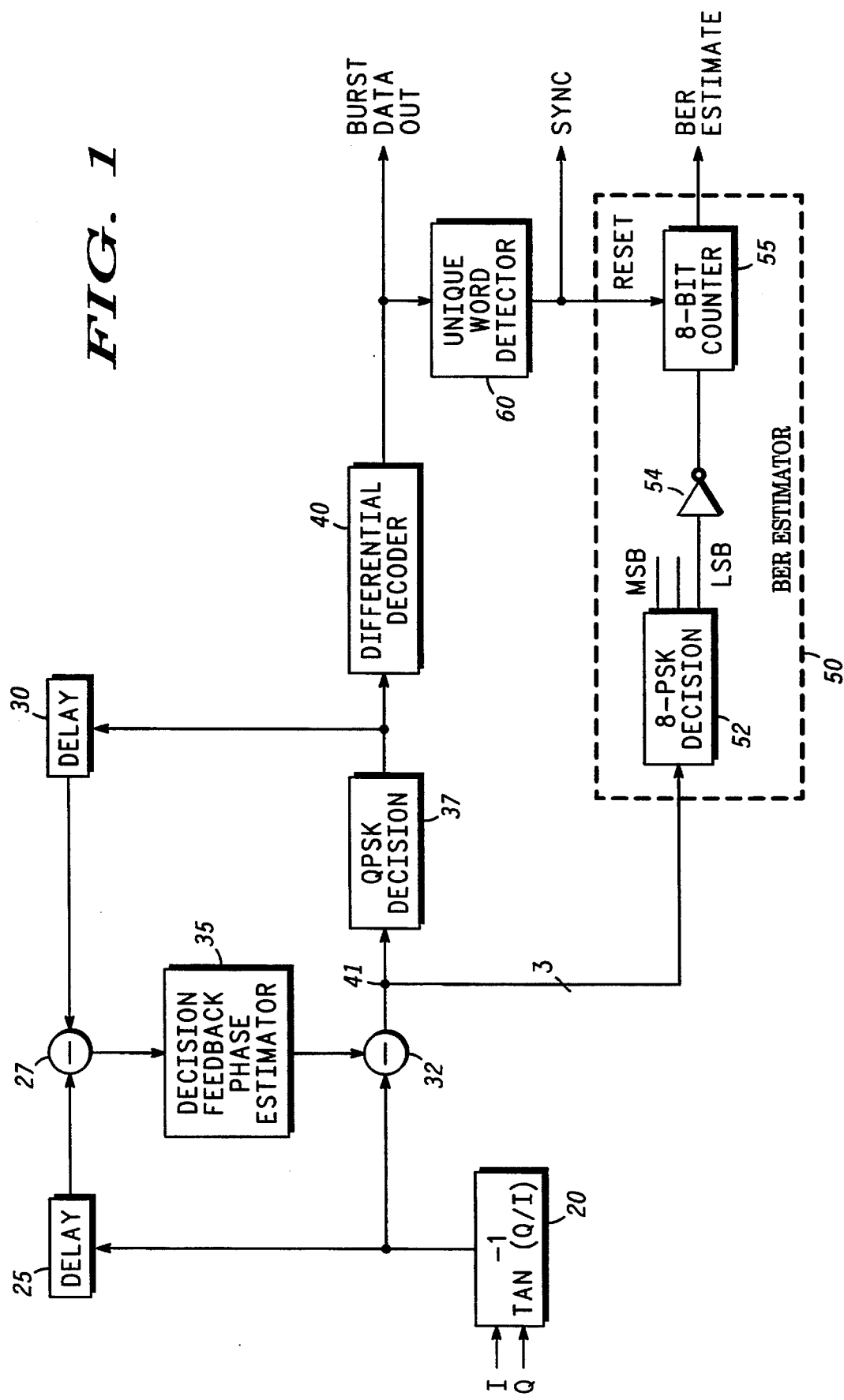
FIG. 1 is a block diagram of a bit error rate estimator in accordance with the present invention.

Referring to FIG. 1 a block diagram of an eight-PSK bit error rate estimator as shown. Inputs I and Q are QPSK modulated quadrature signals transmitted by a complex down converter (not shown) to block 20 which is a $TAN^{-1}$ (Q divided by I). Block 20 digitally converts the signals from complex rectangular to phase angle signals. The arc tangent (Q divided by I) of block 20 converts the rectangular coordinates to polar coordinates at baseband. Only the angle portion of the polar coordinate is used subsequently for processing by the bit error rate estimator.

Arc tangent function 20 is coupled to delay circuit 25 and to subtractor 32. Delay circuit 25 is coupled to subtractor 27. Delay circuit 30 is coupled to subtractor 27 and to QPSK decision block 37. Subtractor 32 is coupled to QPSK decision 37. Differential decoder 40 is coupled to delay circuit 30 and QPSK decision block 37. Differential decoder is coupled to unique word detector 60 and also provides the burst data output. Subtractor 32 and QPSK decision 37 are coupled to eight-PSK decision 52. Eight-PSK decision block 52 is coupled to inverter 54 via the least significant bit lead. Inverter 54 is coupled to eight-bit counter 55. Eight-bit counter 55 provides the bit error rate estimate or pseudo bit error rate for processing by downstream circuitry. Unique word detector 60 is coupled to eight-bit counter 55. Bit error rate estimator includes the eight-PSK decision 52, inverter 54 and eight-bit counter 55.

Figure 2:
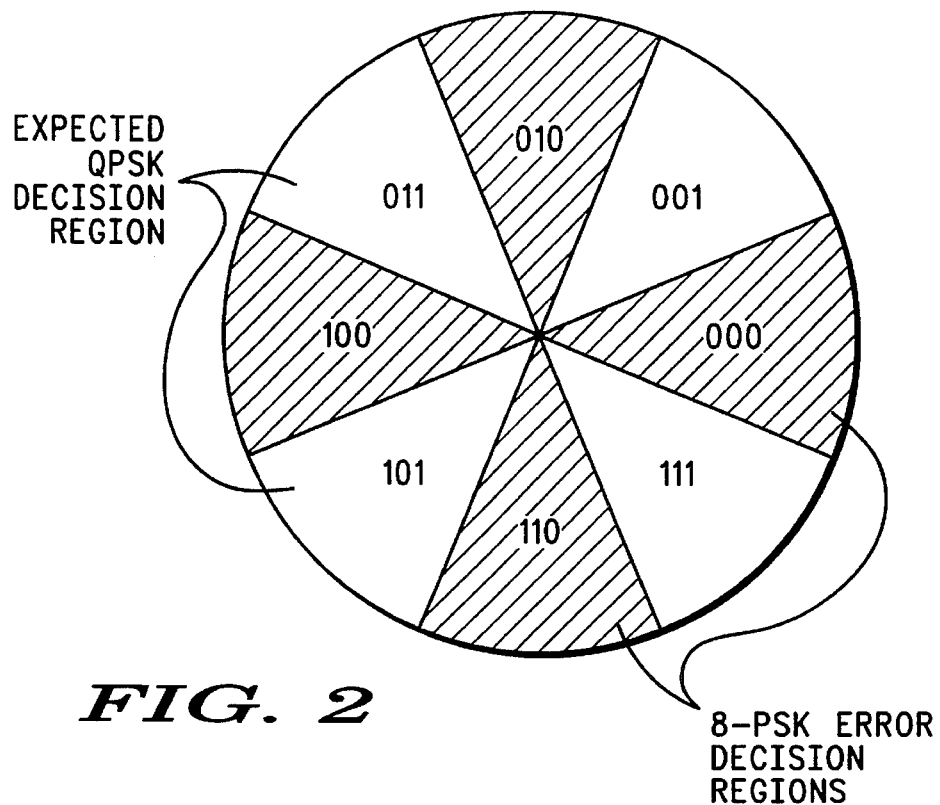
FIG. 2 is a state diagram of the bit error rate estimator of FIG. 1.

The decision feedback loop comprising delay 25, subtractor 27, delay 30, subtractor 32, decision feedback phase estimator 35, and QPSK decision mapper 37 provides an estimate of the demodulation phase at each symbol time of a TDMA burst of data. QPSK decision 37 maps the phase difference between the reference and signal phase into one of four quadrants to obtain a QPSK symbol decision. This symbol decision to delay 30 as an angle where it is subtracted from the angle represented by the arc tangent function of the I and Q signals of block 20. These two signals input to subtractor 27 are delayed so that they can be properly subtracted from one another by subtractor 27. The output of subtractor 27 was transmitted to decision feedback phase estimator 35. The decision feedback phase estimator 35 averages the angle output by subtractor 27. This averaged angle is transmitted to subtractor 32 where it is combined with the angle of the arc tangent function of the I and Q channels, block 20. To produce output 41 which quantizes this angle into a number of bits, the three high order bits of this angle are transmitted via lead 41 to eight-PSK decision 52. Eight-PSK decision mapper 52 makes a decision on the three high order bits transmitted from subtractor 32 to map these bits into one of eight possible states, as shown in FIG. 2. Eight-PSK decision 52 determines which of the four unshaded regions of FIG. 2 the signal is in. The unshaded areas all have the least significant bit equal to one. This bit is gated from eight-PSK decision 52 through inverter 54 where it is counted by eight-bit counter 55. If the signal is in the correct region, an unshaded region, the least significant bit will be a logic 1 and, therefore when inverted by inverter 54, it will be a zero and no error count will be counted by eight-bit counter 55. If the eight-bit PSK decision 52 determines one of the shaded areas, each of the shaded areas has the least significant bit being equal to zero. When inverted by inverter 54, a logic 1 will be produced which indicates an error and will be counted and added into the count of eight-bit counter 55.

The bit error rate (BER) estimate produced by counter 55 is not the actual bit error rate of the particular TDMA burst transmission, but is a pseudo error rate related to the actual bit error rate. The bit error rate estimate is transmitted to circuitry (not shown) which converts the bit error rate estimate to an actual bit error rate. Such circuitry for converting pseudo error rate to bit error rate is known in the art.

Unique word detector 60 detects the end of the converted burst data output from differential decoder 40 and provides a reset signal to counter 55 which resets the counter to zero for each TDMA burst transmitted. The bit error rate estimate is calculated for each TDMA burst. In a preferred embodiment several hundred symbols may comprise one TDMA burst. The shaded sections of FIG. 2 represent phase regions which should not normally be demodulated if the energy per bit to noise ratio is large and the interference is small. As the quality of the radio link between a transmitter/receiver and the radio QPSK error rate degrades, the number of symbol decisions which map into the shaded areas of FIG. 2 will increase. By simply counting such occurrences, observing the logic value of the least significant bit, over a full uplink burst, a pseudo error rate is measured. This pseudo error rate is relatively robust when compared to the actual error rate.

This pseudo error rate relationship between the eight-PSK decision by block 52 and the QPSK decision by block 37 is readily established from detection theory under the assumption that no significant phase bias error is present in the phase estimator 35. One advantage of the present approach is its inherent simplicity. Another advantage is that the accuracy for this estimator is the highest in regions where high bit error rates could result in momentary loss of the radio link. The validity of the present approach has been verified by using the ideal error rate for QPSK and eight-PSK for a special case of only two transmitted values (BPSK).

Figure 3:
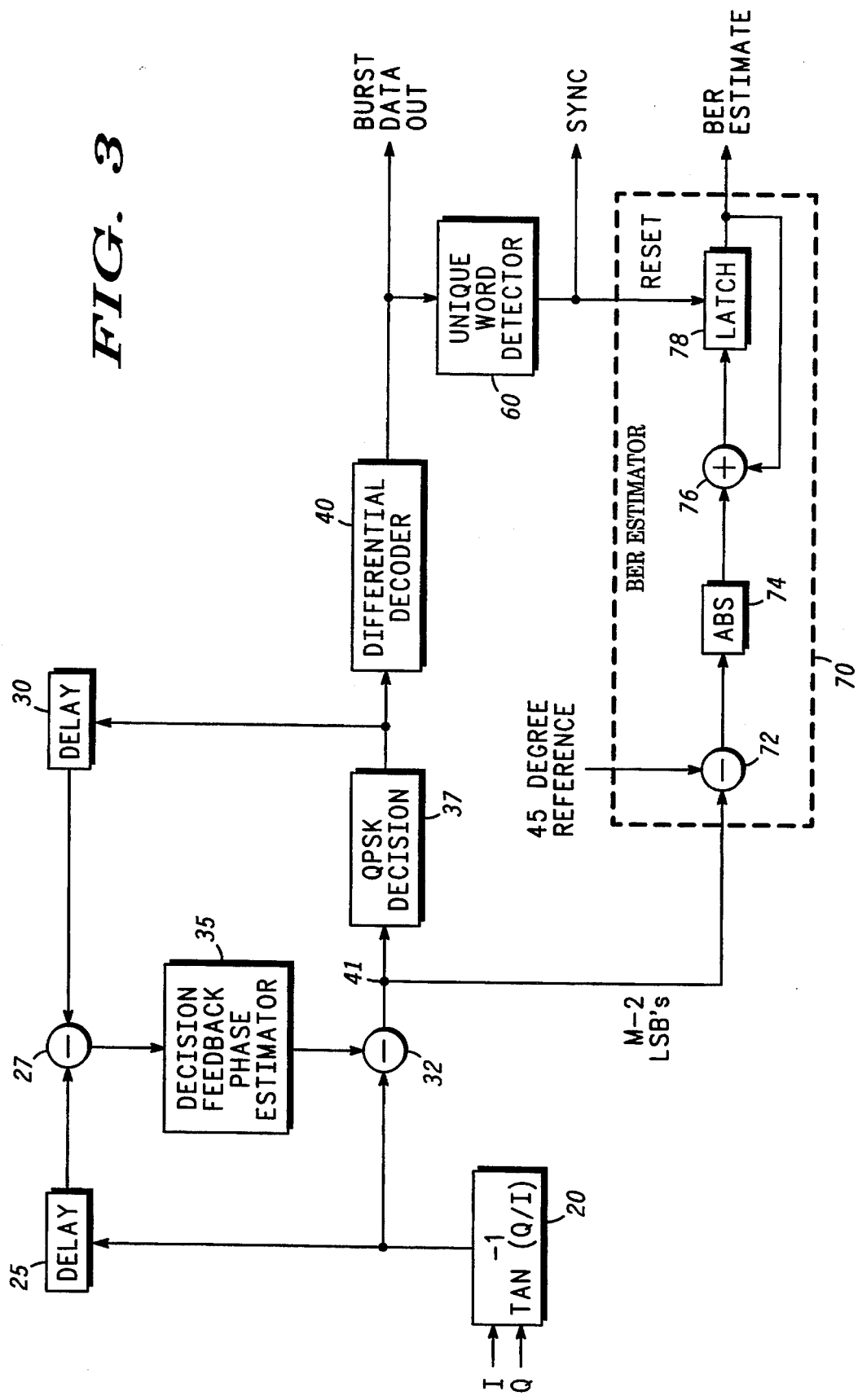
FIG. 3 is a block diagram of a generalized bit error rate estimator in accordance with the present invention.

Referring to FIG. 3, a generalized M-bit bit error rate estimator is shown. Items 20–41 and 60 are the same as described in FIG. 1 and perform in a similar fashion. The eight-PSK decision 52 of FIG. 1 can be generalized by resolving it into finer sectors and weighting the samples in some fashion to provide an error rate estimate. By increasing the sector resolution, the dynamic range of the estimate can be increased to any reasonable level. The functional relationship between the ratio of the energy per bit to the noise plus interference is determined by the weighting used for each sector value. The present bit error rate estimator approach utilizes linear weighting as illustrated in FIG. 3. Generally, this is accomplished for a given sample by multiplying the number of sectors of offset from the reference sector (ideal) times the sector width. Then by summing all bit decisions an average bit error rate estimate is derived.

For the general case of M-bits, where the decision space is partitioned into $2^M$ regions, M bits are required to represent the phase of each sample. Decision feedback phase estimator 35 now produces as an output M bits. The two high order bits of the M bits are transmitted to QPSK decision 37 for subsequent processing and feedback. The low order M−2 least significant bits (LSB) are transmitted from subtractor 32 to subtractor 72. A digitized 45° reference value is input to subtractor 72. According to FIG. 4, which illustrated the M=5 case, the expected QPSK decision regions are shown by the squares and are unshaded areas. Each of these areas is at 45° with respect to the coordinates shown. Therefore, if the expected QPSK decision is received, subtracting 45° from a 45° expected QPSK value will cause subtractor 72 to output zero. Block 74 takes the absolute value of the input from subtractor 72. Adder 76 adds the absolute value to the previous value stored in latch 78. Since the value was zero for an expected QPSK decision, zero will be added to the value previously in the latch indicating that there was no error detected for this particular transmission of bits.

Figure 4:
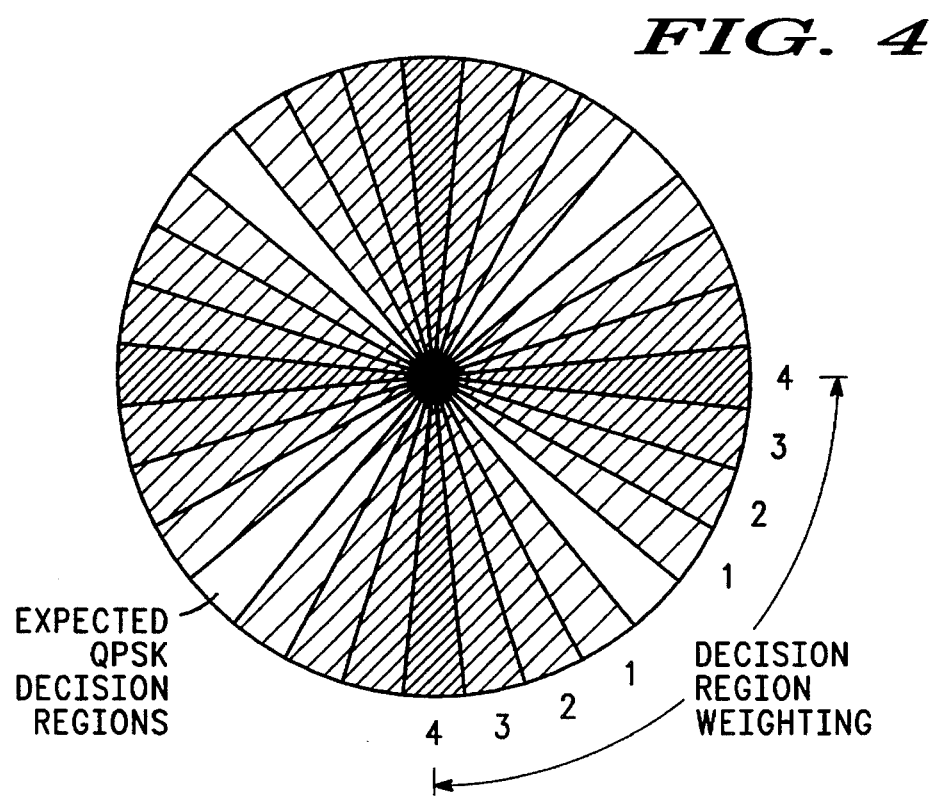
FIG. 4 is a state diagram of the generalized bit error rate estimator of FIG. 3.

As shown in FIG. 4, if the decision feedback phase estimator 35 produces an angle different than 45°, the number represented by the M−2 least significant bits will be from 1–4 for the case of M=5. After the bit error rate estimator 70 takes the difference between the phase output by subtractor 32 and the 45° reference, subtractor 72 outputs a number which is in the range of 1–4. This number may be a positive or negative number, so absolute value function 74 produces just the magnitude of the difference between the expected 45° angle and what was transmitted to be magnitudes 1–4. The absolute value output by block 74 is then added by adder 76 to the previous value in latch 78. As a result, the magnitudes of each symbol decision errors are accumulated over the entire TDMA burst and transmitted to scaling the binary range as described above for FIG. 1.

With the invention described herein, a greater dynamic range may be used for signal transmission since the number of bits per symbol can be increased. Furthermore, this invention provides the improvement that all bits transmitted can be to used improve the error estimation accuracy. As a result, the power of a radio may be increased or decreased so as to eliminate errors from noise or interference during severe radio link conditions and decreased during good conditions to preserve battery life of the radio or radio telephone.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A bit error rate estimator apparatus comprising:

a QPSK decision mapper for mapping an input phase signal into one of four quadrants and producing an output phase signal representing said one of four quadrants;

a feedback phase estimator for averaging a difference signal between said input phase signal and said output phase signal, said feedback phase estimator means coupled to said QPSK decision mapper;

a bit error rate estimator for producing a pseudo error count, over a predefined time period of bit errors of said input phase signal, proportional to a number of said bit errors and to a magnitude of said bit errors of said input phase signal, said bit error rate estimator coupled to said feedback phase estimator;

said input phase signal including quadrature I and Q channel input signals;

an arc tangent function for receiving said I and Q channel input signals and producing an arc tangent function signal of said Q channel input signal divided by said I channel input signal said OPSK decision mapper includes a first subtractor for subtracting said arc tangent function signal from said output phase signal to produce an angle error signal, said first subtractor coupled to said arc tangent function, to said feedback phase estimator and to said OPSK decision mapper; and a second subtractor for subtracting said arc tangent function signal from said output phase signal to produce said difference signal, said second subtractor coupled to said feedback phase estimator.

2. A bit error rate estimator apparatus as claimed in claim 1, wherein said feedback phase estimator includes:

a first delay circuit for delaying said arc tangent function signal, said first delay circuit coupled between said arc tangent function and said second subtractor; and a second delay circuit for delaying said output phase signal, said second delay circuit coupled between said QPSK decision mapper and said second subtractor.

3. A bit error rate estimator apparatus as claimed in claim 1, wherein said bit error rate estimator includes an error mapper for determining an error of said angle error signal and producing said pseudo error count, said error mapper coupled to said first subtractor.

4. A bit error rate estimator apparatus as claimed in claim 3, wherein said error mapper includes:
- a gate for producing a least significant bit of said angle error signal; and
- an inverter for inverting said least significant bit of said angle error signal, said inverter coupled to said gate.

5. A bit error rate estimator apparatus as claimed in claim 4, wherein said bit error rate estimator includes a counter for accumulating a count of errors in said least significant bit of said angle error signal, said counter coupled to said inverter.

6. A bit error rate estimator apparatus as claimed in claim 5, wherein there is further included a reset circuit for resetting said counter at said predefined time.

7. A bit error rate estimator apparatus as claimed in claim 3, wherein said error mapper includes:
- a third subtractor for subtracting a reference angle from said angle error signal to produce a first signal indicating whether there is an error in said error angle signal and the magnitude of said error in said error angle signal; and
- an absolute value circuit for producing a positive value of said first signal, said absolute value circuit coupled to said third subtractor.

8. A bit error rate estimator apparatus as claimed in claim 7, wherein said bit error rate estimator includes:
- an adder for adding a present value of said first signal to a previous value of said first signal, said adder coupled to said absolute value circuit; and
- a latch for storing said added previous and present values of said first signal as said pseudo error count.

9. A bit error rate estimator apparatus as claimed in claim 8, wherein there is further included a reset circuit for resetting said stored pseudo error count at said predefined time.

10. In a radio, a bit error rate estimator apparatus comprising:
- a QPSK decision mapper for mapping an input phase signal into one of four quadrants and producing an output phase signal representing said one of four quadrants;
- a feedback phase estimator for averaging a difference signal between said input phase signal and said output phase signal, said feedback phase estimator means coupled to said QPSK decision mapper;
- a bit error rate estimator for producing a pseudo error count, over a predefined time period of bit errors of said input phase signal, proportional to a number of said bit errors and to a magnitude of said bit errors of said input phase signal, said bit error rate estimator coupled to said feedback phase estimator;
- said input phase signal including quadrature I and Q channel input signals;
- an arc tangent function for receiving said I and Q channel input signals and producing an arc tangent function signal of said Q channel input signal divided by said I channel input signal and;
- said OPSK decision mapper includes a first subtractor for subtracting said arc tangent function signal from said output phase signal to produce an angle error signal, said first subtractor coupled to said arc tangent function, to said feedback phase estimator and to said OPSK decision mapper; and
- a second subtractor for subtracting said arc tangent function signal from said output phase signal to produce said difference signal, said second subtractor coupled to said feedback phase estimator.

11. In a radio, a bit error rate estimator apparatus as claimed in claim 10, wherein said QPSK decision mapper includes a first subtractor for subtracting said arc tangent function signal from said output phase signal to produce an angle error signal, said first subtractor coupled to said arc tangent function, to said feedback phase estimator and to said QPSK decision mapper.

12. In a radio, a bit error rate estimator apparatus as claimed in claim 10, wherein there is further included a second subtractor for subtracting said arc tangent function signal from said output phase signal to produce said difference signal, said second subtractor coupled to said feedback phase estimator.

13. In a radio, a bit error rate estimator apparatus as claimed in claim 10, wherein said feedback phase estimator includes:
- a first delay circuit for delaying said arc tangent function signal, said first delay circuit coupled between said arc tangent function and said second subtractor; and
- a second delay circuit for delaying said output phase signal, said second delay circuit coupled between said QPSK decision mapper and said second subtractor.

14. In a radio, a bit error rate estimator apparatus as claimed in claim 10, wherein said bit error rate estimator includes an error mapper for determining an error of said angle error signal and producing said pseudo error count, said error mapper coupled to said first subtractor.

15. In a radio, a bit error rate estimator apparatus as claimed in claim 14, wherein said error mapper includes:
- a third subtractor for subtracting a reference angle from said angle error signal to produce a first signal indicating whether there is an error in said error angle signal and the magnitude of said error in said error angle signal; and
- an absolute value circuit for producing a positive value of said first signal, said absolute value circuit coupled to said third subtractor.

16. In a radio, a bit error rate estimator apparatus as claimed in claim 15, wherein said bit error rate estimator includes:
- an adder for adding a present value of said first signal to a previous value of said first signal, said adder coupled to said absolute value circuit; and
- a latch for storing said added previous and present values of said first signal as said pseudo error count.

17. In a radio, a bit error rate estimator apparatus as claimed in claim 16, wherein there is further included a reset circuit for resetting said stored pseudo error count at said predefined time.

* * * * *

UNITED STATES PATENT AND TRADEMARK OFFICE
CERTIFICATE OF CORRECTION

PATENT NO. : 5,490,148
DATED : February 6, 1996
INVENTOR(S) : Lansing McLain Carson It is certified that error appears in the above-indentified patent and that said Letters Patent is hereby corrected as shown below:

In column 4, claim 1, line 44, after "input signal" insert --;--.

Signed and Sealed this

Eighth Day of October, 1996

Attest:

BRUCE LEHMAN

*Attesting Officer*   *Commissioner of Patents and Trademarks*